INVENTOR:
Irving Moskovitz
By Smyth, Roston & Pavitt
Attorneys

INVENTOR:
Irving Moskovitz
By Smyth, Roston & Pavitt
Attorneys

DROPOUT COMPENSATOR FOR VIDEO SIGNALS

Filed July 15, 1963 3 Sheets-Sheet 3

INVENTOR:
Irving Moskovitz
By Smyth, Roston & Pavitt
Attorneys

United States Patent Office 3,328,521
Patented June 27, 1967

3,328,521
DROPOUT COMPENSATOR FOR VIDEO SIGNALS
Irving Moskovitz, Monterey Park, Calif., assignor to Minnesota Mining and Manufacturing Company, St. Paul, Minn., a corporation of Delaware
Filed July 15, 1963, Ser. No. 294,834
22 Claims. (Cl. 178—6.6)

The present invention relates to information transmission or reproduction systems and, more particularly, to means for compensating for the deterioration or complete loss or "drop-outs" in the transmission or reproduction of signals such as are employed in televsion systems.

At the present time, it is a common practice to magnetically record television or video signals on a magnetic tape and to then reproduce the signals at a later date by replaying the tape. Although this is normally an effective means of reproducing the television signals, occasionally the recording or playback apparatus malfunctions and thereby causes a momentary loss of the signal. Also, it is not uncommon for debris accumulated by the tape or head, flaws in the tape such as craters or scratches, foreign particles in the coating of magnetic oxide or protrusions on the tape to cause the television signal to momentarily be lost or "drop-out." When such a drop-out of the signal occurs, the electron beam in the picture tube will not be properly modulated during the existence of the drop-out. This, in turn, will cause a spot or streak on the face of the picture tube which is excessively bright or dark in comparison to the remaining portions of the picture. This is a very conspicuous characteristic that is extremely disturbing and annoying to a viewer. As a result, a substantial amount of effort has been expended in the industry to provide a more perfect television picture by minimizing the effects of "drop-outs."

Heretofore, the only successful means for eliminating the objectionable bright spots or dark spots by compensating for the "drop-outs" is a system such as disclosed in copending application Ser. No. 204,568, filed June 22, 1962, in the name of Berten A. Holmberg, and assigned to Minnesota Mining and Manufacturing Company. In such a system, a conventional tape recorder is employed to record a frequency-modulated video or television signal. When the television radio frequency signal is played back from the tape, it is divided into two substantially identical components with one of the components being delayed with respect to the other component by an interval of time that is substantially equal to the time required for one horizontal scan period. During normal conditions, the undelayed component is utilized and the delayed component is suppressed. Means are also provided that sense the occurrence of a defect in the signal such as a "drop-out" and actuate a switch means that are effective to suppress the undelayed component to be utilized during the existence of the drop-out condition. Because a television signal during any given scan is largely redundant over the adjacent scan, the occasional and random repeating of a horizontal line or limited portions of such a line will generally be unnoticed by an observer.

Although such a system has been very successful in eliminating the undesirable effects of drop-out of television signals, it is now proposed to provide a new and improved version of the foregoing system. This system employs new and improved means for sensing the occurrence of an objectionable abnormal signal or "drop-out" and new and improved means for switching from one signal to the other signal during the existence of an abnormal condition without creating visually noticeable or objectionable alterations to the picture display.

These and other features and advantages of the present invention will become readily apparent from the following detailed description of one operative embodiment of the present invention, particularly when read in connection with the accompanying drawings wherein like reference numerals refer to like parts, and wherein.

Figure 1:
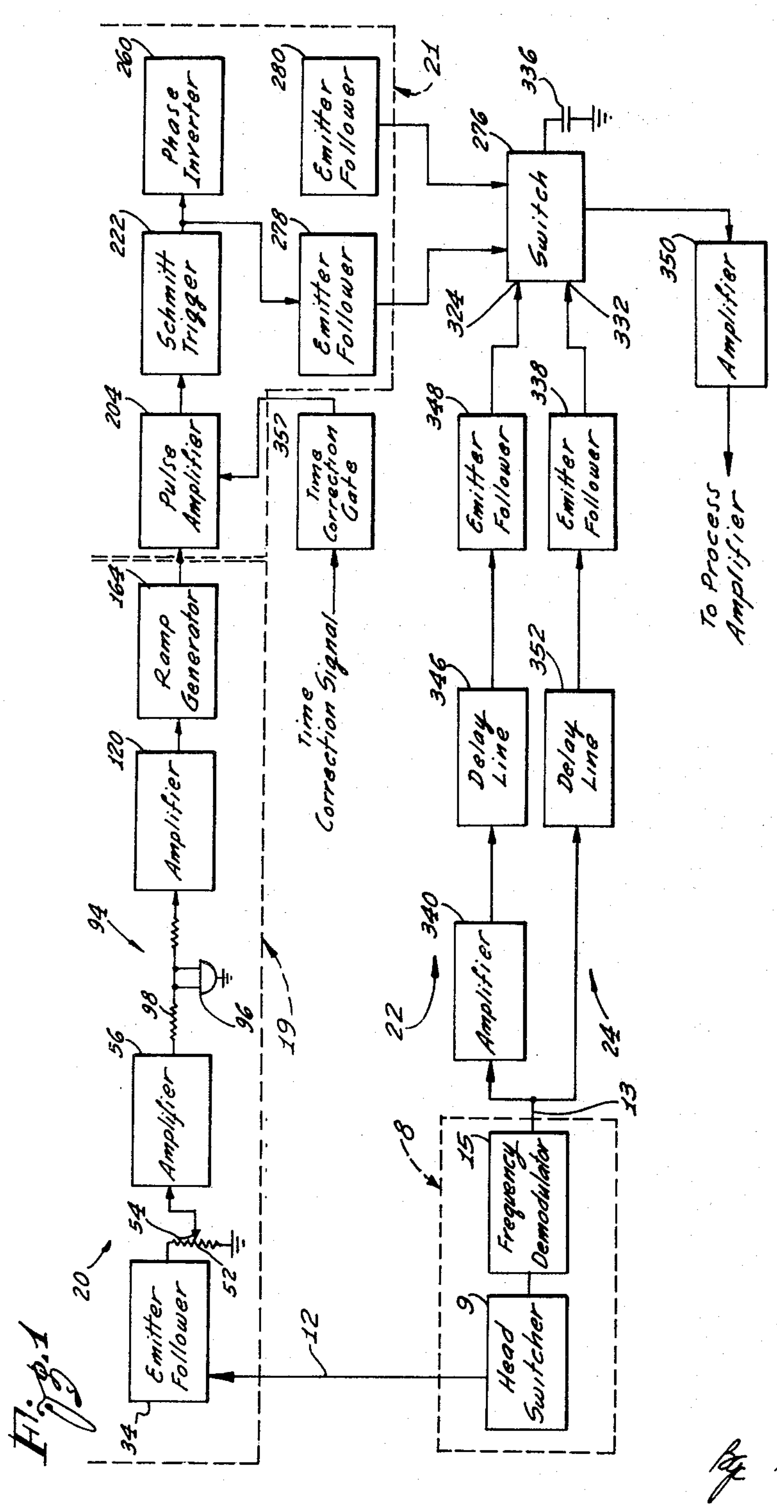
FIGURE 1 is a block diagram of a signal drop-out compensating system embodying one form of the present invention particularly adapted for use with a video tape recording and reproduction system.

Referring to the drawings in more detail, and particularly to FIGURE 1 thereof, the present invention is particularly adapted to be embodied in a television drop-out system 10 for use with a conventional video tape recording system. The drop-out system 10 includes a first input 12 that may be interconnected with the head switcher 9 in the tape recorder 8 so as to receive the signal therefrom. A signal of this nature will generally resemble the signal 14 shown in FIGURE 5. This signal will normally be of radio frequency and will be frequency modulated with the video signal or information or intelligence that is to be reproduced on the face of a picture tube. In addition, the system 10 includes a second input 13 that may be interconnected with a demodulator 15 in the tape recorder so as to receive the signal therefrom. The demodulator 15 is effective to demodulate the R.F. signal 14 from the head switch 9. As a result, the output from the demodulator 15 will be a standard video signal.

In the event the reproduction system or tape recorder 8 is working satisfactorily, the reproduced video signal 14 will be of substantially constant amplitude and substantially equally disposed above and below a center line. However, in the event of a malfunction such as a "drop-out," the amplitude of the reproduced signal will be depressed or have a notch 16 in its envelope. That is, the amplitude of the signal drops to zero or so close to zero that it is impossible to obtain a video signal from the demodulator 15. Such a drop-out may occur as a result of numerous factors. For example, an accumulation of dirt and debris may pass through the tape transport or pick-up heads. Also, there may be flaws in the tape such as craters, scratches or foreign particles in the magnetic coating, or there may be clumps of magnetic oxide or backing protrusions on the tape. Although it is possible for a drop-out to persist for an extended interval, it has been found that as a practical matter the "drop-out" or loss of signal seldom exceeds a few microseconds. The period between successive scans of the video signal is approximately 63.5 microseconds. Accordingly, the information that is lost by a drop-out normally represents only a small fraction of a scan line.

Figure 5:
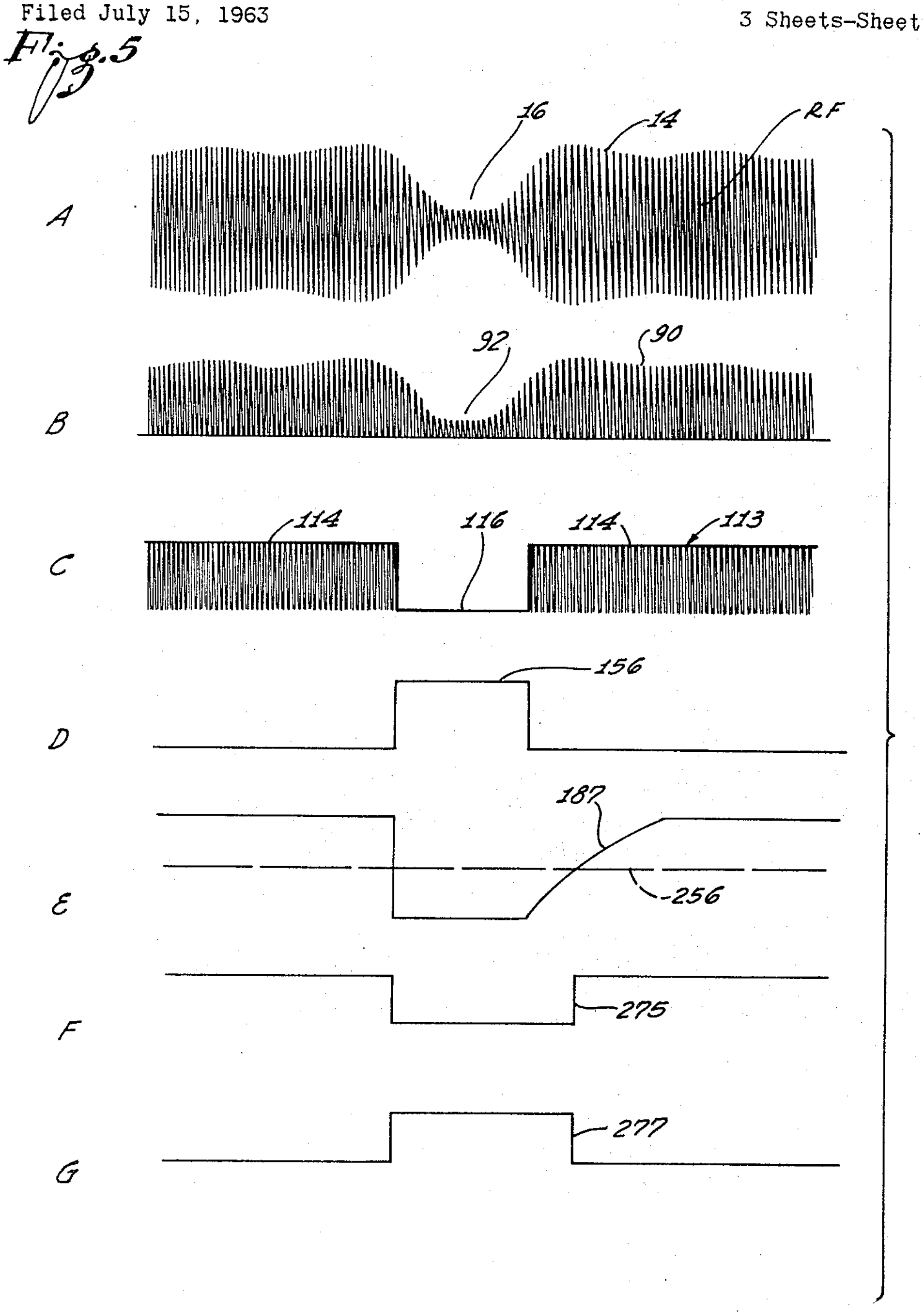
FIGURE 5 is a series of waveforms that are present in various portions of the system.

The first input 12 to the system 10 is adapted to be interconnected with the head switcher so as to receive the frequency modulated signal 14 including any drop-outs such as that shown in line A of FIGURE 5. The input 12 leads to a branch 20 of the system that includes a detector 19 that is effective to scan the video signal 14 and sense the occurrence of any drop-outs therein and a switch driver 21 to provide one or more control signals that indicate the occurrence of the drop-out. The second input 13 leads to a branch 22 that is effective to delay the video signal 14 by an interval (for example 63.5 microseconds) that is substantially equal to the period of a horizontal scan. The second input 13 also leads to a branch 24 that is effective to pass the video signal 14 directly therethrough with little or no change.

Figure 3:
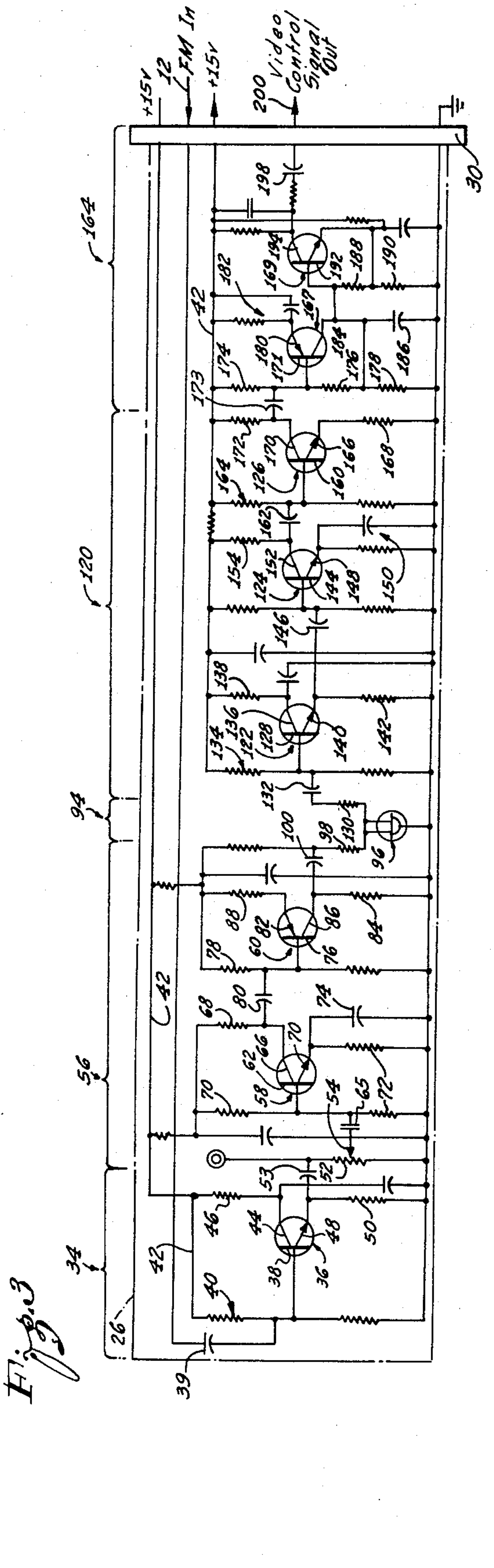
FIGURE 3 is a wiring diagram of a portion of the drop-out system of FIGURE 1.
Figure 4:
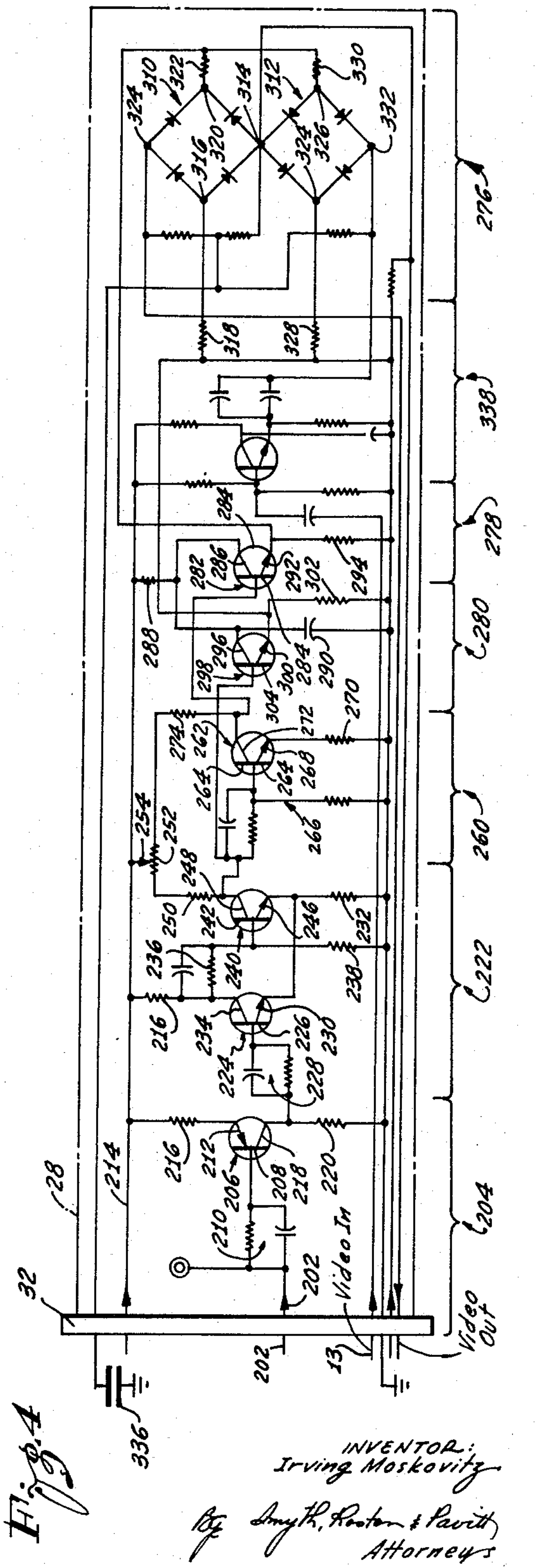
FIGURE 4 is a wiring diagram of another portion of the system of FIGURE 1.

The first branch 20 including the detector 19 and the switch driver 21 may be mounted on a pair of circuit boards 26 and 28 (FIGURES 3 and 4). Each of the circuit boards includes a connector jack 30 and 32 on the ends thereof for interconnecting the boards with various portions of the circuit. The first stage of the branch 20 and of the detector 19 is an impedance matching and isolating stage. Although this stage may provide some gain or amplification, normally the signal is of adequate amplitude. In the present instance, this stage is an emitter follower 34 (FIGURES 1 and 3) having a transistor 36 (FIGURE 3) therein. The base 38 of the transistor 36 is coupled to the source of the frequency modulated signal (i.e., the head switcher 9) by means of a coupling condenser 39. Thus, the frequency modulated signal 14 from the heads will be present on the base 38. The base 38 is also connected to the mid-point in a resistive biasing network 40 that extends between ground and a supply line 42 having a positive potential thereon. The collector 44 is connected to the supply line 42 by means of a resistor 46 while the emitter 48 is connected to ground by a load resistor 50.

The emitter 48 is coupled to the upper end of a potentiometer 52 by means of a condenser 53. The lower end of the potentiometer 52 is connected to ground. It may thus be seen that the frequency modulated signal 14 will be impressed across the potentiometer 52. The center tap 54 of this potentiometer 52 may be moved between the opposite ends of the potentiometer 52 so as to vary the amount of the video signal 14 present. As will become apparent subsequently, by adjusting the center tap 54 and varying the amplitude of the signal in this manner, the sensitivity of the entire system 10 will be varied. That is, the magnitude of the drop-out that will actuate the system 10 can be controlled.

The adjustable center tap 54 is coupled to the input of an amplifier 56 by means of a condenser 65 so as to supply the variable amplitude video signal 14 thereto. The present amplifier 56 includes two separate transistors 58 and 60 which are cascaded with each other. The base 62 of the first transistor 58 is connected directly to the junction in a resistive biasing network 64 and is coupled to the center tap 52 by a condenser 65. The collector 66 is connected to the supply line 42 by a load resistor 68 while emitter 70 is grounded by the resistor 72 and condenser 74. The second transistor 60 has its base 76 connected to the junction in a resistive network 78 between ground and the supply line 42 and is coupled to the collector 66 by a condenser 80. The emitter 82 is connected to the supply line 42 by a resistor 88 while a load resistor 84 extends from the collector 86 to ground.

The amplifier 56, among other things, will be effective to increase the amplitude of the signal to a more useful level whereby the signal-to-noise ratio of the signal will be kept at a relatively high amount. In addition, the amplifier 56 will be effective to clip or otherwise suppress one-half of the signal 14 (FIGURE 5A). As a result, the signal 90 (FIGURE 5B) present across the resistor 84 will be substantially only the top or positive half of the original radio frequency signal 14, similar to the waveform shown in FIGURE 5.

The lower edge of the envelope of this signal 90 is preferably straight. However, in the practical situation, it may be somewhat irregular. The upper or positive side of the envelope of the signal 90 will still contain all of the noise originally present in the signal including any notches 92 produced as a result of the original "drop-out."

The output of the amplifier 56 (FIGURES 1 and 3) may be interconnected with a suitable detecting means 94 that will be responsive to the variations in the amplitude of the video signal 90, and more particularly will sense any variations or notches 92 produced as a result of the original drop-out 16. In the present instance, this detector 94 includes a tunnel diode 96 that has one side connected directly to ground. The other side of the diode 96 is connected to the output collector 86 (FIGURE 3) of the transistor 60 by means of a resistor 98 and a coupling condenser 100.

Figure 2:
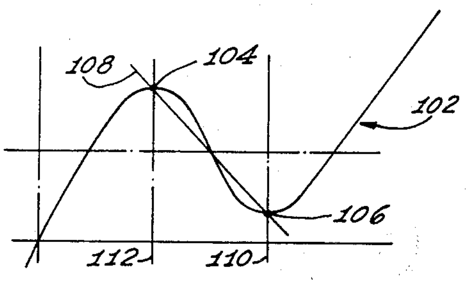
FIGURE 2 is a graph representing the operating characteristics of portions of the system.

The tunnel diode 96 is a semi-conductor device with a characteristic similar to the reversely curved line 102 in FIGURE 2. More particularly, as the voltage across the diode 96 increases from ground potential in a positive direction, the current flow through the diode 96 will increase until it reaches a maximum point 104. Further increasing the voltage in a positive direction will then cause the current to dip or decrease until it reaches a minimum amount 106. Beyond this point, a further positive increase of the voltage will cause the current to again increase.

The various parameters of the output stage of the amplifier 56 formed by the transistor 60 and particularly the resistors 88 and 84 may be adjusted so as to cause the output characteristics of the amplifier 56 to follow the substantially straight line 108 in FIGURE 2. More particularly, the voltage across the resistor 84 increases positively as the current decreases. These parameters are preferably selected to cause the line 108 to intersect the curve 102 substantially at the maximum and minimum points 104 and 106. It will be noted at the minimum point 106 the voltage is high and the current is low and, therefore, the diode 96 will appear as a very high resistance. Conversely, at the maximum point, the voltage is low and the current is high and, therefore, the diode 96 will appear as a very low resistance.

The combination of the output stage of the amplifier 56 (FIGURES 1 and 3) and the tunnel diode 96 will thus form a bistable circuit that will operate at either the maximum level and have a low resistance or at the minimum level and have a high resistance. Although the two lines 102 and 108 may intersect at or near the inflection point, this is a relatively unstable condition and will be unable to persist for any appreciable period of time.

The higher voltage 110 (FIGURE 2) which produces the minimum current flow may be set to correspond to the minimum acceptable amplitude for the video signal 14 (FIGURE 5A). As a consequence, when the signal 14 is normal or meets these minimum acceptable standards, the tunnel diode 96 will appear as a high resistance and the signal 90 (FIGURE 5B) may pass over the diode 96. The voltage 112 (FIGURE 2) producing the maximum current flow may be set to correspond to the level at which the drop-outs become of an objectionable magnitude. As a consequence, when the signal 14 is not of acceptable magnitude, the tunnel diode 96 (FIGURES 1 and 3) will appear as a low resistance and the signal will be shorted through the diode 96 to ground. As previously pointed out, by varying the position of the center tap 54 (FIGURE 3) in the drop-out sensitivity potentiometer 52, the amplitude of the R.F. signal 14 may be varied. This will, in turn, be effective to determine the magnitude of the notch 16 or drop-out that will be detected.

It may thus be seen that the output signal 113 obtained from the tunnel diode 96 will consist of an R.F. signal having an envelope with a substantially constant amplitude when the amplitude of the original R.F. signal 14 is at an acceptable level. However, as soon as the level of the R.F. signal 14 falls to the objectionable drop-out level, the envelope for the signal 113 at the diode 96 will fall to substantially zero. In other words, this arrangement will act as a switch that will be effective to shut off the signal 90 whenever the R.F. signal 14 goes below a preset level. As seen in FIGURE 5, the signal 113 will have an envelope with a substantially constant positive amplitude 114 with a gap or no signal during the interval. This interval will be substantially identical in timing and duration to the original drop-out condition 16.

The output of the tunnel diode 96 may be interconnected with the input to an amplifier 120 (FIGURES 1 and 3). The primary purpose of this amplifier 120 is to provide gain or amplification for restoring the amplitude of the signal at the output of the tunnel diode 96 to a more useful level and maintaining the signal-to-noise ratio at a high level. The amplifier 120 includes three transistors 122, 124 and 126 (FIGURE 3), the first of which has the base 128 coupled to the tunnel diode 96 by a condenser 132 and a resistor 130 so as to receive the signal 113. The base 128 is also connected to the junction in a resistive biasing network 134 extending from the positive line 42 to ground. The collector 136 is connected to the positive supply line 42 by a resistor 138 while the emitter 140 is grounded by a load resistor 142. The second transistor 124 has the base 144 thereof coupled to the emitter 140 by means of a capacitor 146. The first transistor 122 will thus function as an emitter follower which will be effective to match the impedance and isolate the tunnel diode 96 from the input capacitance of the amplifier 120.

The second transistor 124 has the emitter 148 connected to ground by means of a resistor-condenser 150 while the collector 152 is connected to the positive supply line 42 by means of a load resistor 154. The signal 156 (FIGURE 5C) present at this collector 152 will be at a reference level during normal conditions; however, during the absence of signals from the tunnel diode 96 during the interval 116, the collector 152 will be biased less conductive. Thus, a positive going pulse 156 will occur as the collector 152 will rise toward the potential of the supply line 42.

The third transistor 126 has the base 160 thereof connected to the collector 152 by means of a coupling condenser 162 and to a voltage dividing biasing network 164 that extends between ground and the positive supply line 42. The emitter 166 of this transistor 126 is connected to ground by a resistor 168 while the collector 170 is connected to the supply line 42 by a load resistor 172. This transistor 126 during normal operating conditions will be biased toward a heavily conductive state. When the positive pulse 156 at the collector 152 occurs, indicating a drop-out has occurred, the base 160 of the transistor 126 will be biased to make the collector 170 more conductive. Therefore, a negative going pulse 155 will occur at the collector 170.

The output of the amplifier 120 is interconnected with a circuit that will be effective to operate as a pulse stretcher and increase the time duration of the negative-going pulse produced at the output of the amplifier 120. This circuit may be of any suitable variety having integrating means or means that will require an extended period of time for a voltage signal to recover. In the present instance, this circuit includes a ramp generator 164 (FIGURES 1 and 3) having a pair of transistors 167 and 169 that (FIGURE 3) are connected in cascade with each other. The first transistor 167 has the base 171 coupled to the output of the amplifier 120 by means of a condenser 173. The base 171 is also connected to the junction between a resistor 174 and a resistor 176 in a biasing network that extends between the supply line 42 and the collector 184. This network also includes a third resistor 178 and capacitor 186 that extend from the junction of resistor 176 and collector 184 to ground.

The emitter 180 is connected to the supply line 42 by means of a resistor-condenser network 182. The collector 184 is connected to the junction between the resistors 176 and 178 in the network. The collector 184 is also connected to ground by means of a condenser 186 and a voltage divider having a pair of resistors 188 and 190 therein. During normal conditions, the base 171 will be maintain sufficiently positive by the network to maintain the collector 184 biased non-conductive. The potential of the collector 184 will thus be at substantially the same potential as the junction between the resistor 176 and the resistor 178. The condenser 186 will then acquire a charge having the same potential as the voltage across the resistor 178. At the same time, the potential will be applied to the base 192 of the transistor 169. This potential will be effective to bias the collector 194 toward non-conduction. The collector 194 will thus be maintained at a positive potential equal or nearly equal to the potential on the supply line 42.

In the event of a drop-out and a negative pulse at the output of the amplifier 120, the collector 184 will become conductive. This will, in effect, short the collector 184 to the supply line 42 through network 182 and cause the condenser 186 to have a more positive potential thereacross. Since this charging circuit has a relatively low resistance, the condenser 186 will substantially instantly become positive and remain positive. This positive potential will cause the collector 194 to conduct and become more negative. At the end of the pulse the collector 184 will again become non-conductive and the voltage thereon will tend to fall. However, the discharge path for dissipating the charge on the condenser 186 has a higher resistance. As a consequence, an extended interval will be required for this potential to again return to the lower reference level. The potential across the condenser 186 will gradually return back to the reference level in a manner similar to the curved line 187 in FIGURE 5E. Since the base 192 is connected to this potential, the current in the collector 194 will vary in a similar pattern. This, in turn, will cause the potential of the collector 194 to gradually rise up to the potential of the line 42.

It may thus be seen that when a negative-going pulse is provided at the output of the amplifier 120, the first transistor 167 will invert the pulse into a positive one and will increase its duration by an amount that is equal to the period required for the potential on the condenser 186 to recover. The second transistor 169 will be effective to invert the lengthened pulse to a negative one and if the transistor 169 is biased so as to saturate when it conducts, the amplitude of the pulse will be clamped to a fixed level. This ramp generator will therefore function as a pulse "stretcher" that will increase the duration of the drop-out pulses by a predetermined interval. The output of the ramp generator 164 is coupled by means of a condenser 198 to an output connector pin 200 on the jack 30 on the end of the circuit board 26.

The jack 32 (FIGURE 4) on the second circuit board 28 includes a pin 202 that is interconnected with the output pin 200 on the jack 30 so as to receive the stretched pulse from the ramp circuit 164. The pin 202 is also connected with a suitable pulse amplifier 204. This amplifier 204 includes a transistor 206 which has its base 208 connected to the pin 202 by a resistor condenser network 210. The emitter 212 is connected to a supply line 214 with a positive potential thereon by a resistor 216. The collector 218 is connected to ground by a load resistor 220. This amplifier 204 will be effective to receive the negative stretched pulse from the ramp generator 164 and invert it into a positive pulse across the resistor 220. It may thus be seen that the output from the detector 19 will be a pulse that is substantially coincident with the occurrence of the drop-out but is slightly longer in duration.

The input to the switch driver 21 is connected to the detector 19 to receive the pulse. This input to the driver 21 preferably includes a pulse shaping circuit such as a Schmitt trigger circuit 222. Such a circuit normally has two sides that are alternatively conducting. The potential on one side will normally be high and the potential on the other side will be low. However, whenever the potential on the input changes past a critical level, the two sides will reverse their states as long as the input is beyond the critical level.

The present Schmitt trigger circuit 222 (FIGURES 1 and 4) includes a first transistor 224 (FIGURE 4) which has the base 226 thereof connected to the collector 218 by means of a resistor-condenser coupling network 228. The emitter 230 is connected to ground by means of a common resistor 232. The collector 234 is connected to the supply line 214 by means of a load resistor 216. The collector 234 is also connected to ground by a pair of resistors 236 and 238 and a condenser.

A second transistor 240 is provided that has its base 242 connected to the junction between the resistors 238 and 236. The base 242 will thus be maintained at a predetermined fraction of the potential of the collector 234. The emitter 246 is connected to ground by the common resistor 232. The collector 248 is connected to a load resistor 250 that is, in turn, connected to one end of a potentiometer 252. The center tap 254 of the potentiometer 252 is, in turn, connected to the positive supply line 214. Normally, the potential on the base 226 will be sufficiently negative to maintain the collector 234 biased nonconductive. This, in turn, will maintain the base 242 sufficiently positive to cause the collector 248 to be conductive. As a consequence, the potential on the second collector 248 will normally be below.

Whenever the potential across the resistor 220 becomes more positive than a critical amount such as the dotted line 256 in FIGURE 5, the base 226 will be biased so that the collector 234 will conduct. This, in turn, will cause the base 242 to become sufficiently negative to cause the transistor 240 to become non-conductive and the potential at the collector 248 will become more positive. This condition will persist as long as the potential of base 226 is above the potential of the line 256.

As soon as the potential of base 226 becomes equal to or less than the critical level, the collector 234 will instantly become non-conductive and its potential will equal line potential. This, in turn, will make the base 242 sufficiently positive to make the collector 248 conductive again. The rate at which this change occurs will be very high so that it will occur almost instantaneously.

It will thus be seen that the two transistors 224 and 240 will be alternatively conductive and non-conductive. This will cause a negative-going squarewave to be produced on the first collector 234 and a positive-going squarewave to occur on the collector 248. These two squarewaves will occur simultaneously with each other. The time duration of the pulses will be equal to the duration of the drop-out notch 16 as detected by the diode 96 plus an interval of time equal to the period required for the voltage at the output of the ramp generator 164 to recover to the level of the line 256 (FIGURE 5E). Theoretically, the amplitude of the two squarewaves may be made identical. However, the amplitude of the first pulse will to some extent be a function of the amplitude of the pulse from the amplifier 204. As a consequence, there may be sufficient variation in the pulse from the amplifier 204 to cause the two squarewaves present at the collectors 234 and 248 to be of asymmetrical amplitudes.

In order to overcome the foregoing, a phase inverter 260 (FIGURES 1 and 4) may be connected to the output point of the second side of the trigger circuit, i.e., the collector 248 of the transistor 240. This phase inverter 260 includes a transistor 262 (FIGURE 4) which has its base 264 connected to a junction in a resistor network 266 that extends from the collector 248 to ground. Thus, the base 264 will be driven at the same predetermined fraction of the potential on the collector 248. The emitter 268 is connected to ground by means of a resistor 270. The collector 272 is interconnected with the opposite side of the balancing potentiometer 252 by a resistor 274. The transistor 262 will be biased so that when the collector 248 is conductive, the other collector 272 is non-conductive and vice-versa. The pulse amplitude will be substantially equal and inverted. It will thus be seen that the signals present on the two collectors 248 and 272 will be substantially identical to each other in that they will be of identical timing and duration. Further, by varying the setting of the center tap 254 in the potentiometer 252, the amount of conduction of the collectors 248 and 272 and therefore the voltage drop across the resistors 250 and 274 may be carefully balanced so that the amplitudes of the squarewaves 275 and 277 may be substantially identical to each other.

Since the negative pulse on the collector 272 and the positive pulse on the collector 248 occur at the same time as the drop-out, they may be used to control a switching circuit 276 for switching between the video signals during a drop-out. In order to isolate the Schmitt trigger circuit 222 from the effect of the switching load and vice-versa, a buffing or isolating means may be employed. In the present instance, this is accomplished by a pair of substantially identical emitter followers 278 (FIGURES 1 and 4) and 280 that are DC coupled to the Schmitt trigger circuit 222 and the phase inverter 260. The first follower 278 includes a transistor 282 (FIGURE 4) that has its base 284 connected to the collecter 272. The collector 286 of the transistor 282 is connected to the supply line 214 by a resistor 288 and to ground by a condenser 290. The emitter 292 is connected to ground by means of a load resistor 294. The second emitter follower 280 is very similar in that the collector 296 of the transistor 298 is also connected to the resistor 288 and the emitter 300 is grounded by the load resistor 302. The two emitters 292 and 300 may then be connected to the switch 276 so as to apply the two square pulses of opposite polarity to the switch 276 for controlling its operation. It will thus be seen that a DC or direct coupling is provided through the entire switch driver 21, i.e., from the Schmitt trigger 222 and phase inverter 260 to the switch mechanism so as to apply the pulses directly thereto.

The switch 276 that is actuated by the switch driver 21 preferably is capable of switching in an extremely short time and prevent the generation of incidental switching transients. Also, the switch 276 should have an extended frequency response so that it will have a response that is essentially flat over a bandwith on the order of about 6 cycles per second to 8 megacycles.

In the present instance, the switch 276 (FIGURES 1 and 4) is of the diode variety and more particularly it includes a pair of bridge diode circuits 310 and 312 (FIGURE 4) that are joined together at a common junction that forms a common output 314. One of the control corners 316 of the first bridge 310 is connected directly to the emitter 300 of the emitter follower 280 while the opposite control corner 320 is connected directly to the other emitter 292 by a resistor 322. It will thus be seen that whenever the Schmitt trigger circuit 222 changes its state, a positive pulse 277 (FIG. 5G) will be applied to one control corner and simultaneously therewith a negative pulse 275 will be applied to the other control corner. Normally, the two control corners 316 and 320 will be so biased that a signal applied to the corner 324 will not circulate to the output. However, the combination of the two pulses will be effective to change the bridge 310 from its normally non-conductive state to a conductive state whereby a signal applied at the input corner 324 may circulate through the bridge 310 to the output 314.

The second bridge circuit 312 (FIGURES 1 and 4) is very similar to the first bridge 310 except the diodes are all reversed. The two control corners 324 (FIGURE 4) and 326 also connect directly to the emitters 292 and 300 in the two emitter follower circuits 278 and 280 by means of the resistors 328 and 330. Normally, this will maintain the bridge 312 conductive whereby a signal present at the input corner 332 may circulate to the output 314. However, when the Schmitt trigger circuit 222 changes its state and causes the control pulses to be applied to the first bridge circuit 310 the identical positive and negative pulses will be simultaneously applied to the two control corners 324 and 326 of the second bridge circuit 312. This will be effective to switch the second bridge circuit 312 from its normally conductive state to a non-conductive state for the duration of the two pulses. Thus, if a signal is applied to the input corner 332, it will normally circulate through the bridge circuit 312 to the output junction 314, but during the existence of the control pulses, this signal will be blocked from passing through the bridge circuit 312.

In order to accomplish a precise and balanced switching between the two bridge circuits 310 and 312, it is necessary for the output 314 to be maintained at a proper potential relative to the average amounts of potentials applied to the control corners 316–320 and 324–326. Accordingly, since the durations of the pulses and the amount of the potential applied to the control corners will vary, it is virtually impossible to clamp the output 314 to any particular reference level. This is of particular importance in view of the fact that there is a direct coupling over several stages which extends from the Schmitt trigger circuit 222 and the phase inverter 260 all the way through the diode switching network 276. Because of this direct coupling and the relatively low frequency of some portions of the signal, small variations anywhere in the circuit will produce substantial variations or DC drift that will tend to unbalance the two bridges 210 and 312. If the bridges are unbalanced, the switching action will be defective and there may be a "bounce" to the signal at the instant of switching.

Accordingly, the reference or output 314 of the switch 276 may be interconnected with a large size condenser 336 that will tend to stabilize the potential. By way of example, in one embodiment this condenser 336 had a capacity on the order of 4,000 microfarads. This condenser 336 will thus act as a power supply wherein the voltage can only vary at a slow rate. However, the potential will correspond very closely to the average potential at the center point 314. This, in turn, will cause the output DC level to drift at approximately the same rate as the drifting of the various points in the circuit and the potentials at the various control corners will always be maintained substantially symmetrically about the output 314.

The first input corner 324 of the diode switching network 276 may be interconnected with the second branch 22. This branch 22 includes delay means that will be effective to delay the video signal 14 by a predetermined fixed amount. More particularly, this branch 22 includes an input amplifier 340 that has its input connected to the output of the frequency demodulator 15 to receive the video signal. The amplifier 340 is effective to increase the amplitude of the video signal to a much greater magnitude. The amount of gain preferably will just compensate for the losses or attenuations which may occur within this branch 22.

A delay line 346 is interconnected with the output of the amplifier 340 so as to receive the amplified video signal. This delay line 346 may be of any desired variety, such for example, as an ultrasonic delay element that will provide a fixed delay. By way of example, a quartz crystal or lumped constant delay line may be employed. The output of the delay line should be approximately equal to the amount of delay between the successive horizontal scans. In the normal system, this will be approximately 63.5 microseconds. Although the delay line 346 may have a very wide pass band, it is not necessary. The delay line 346 only has to pass the brightness information. In the very short time that the signal is obtained from this delay line, the human eye is unable to observe a limited amount of degradation in the small area of the video display. Accordingly, it has been found that the delay line may have an upper limit to its pass band in the region of 200 to 500 kilocycles with an objectionable amount of degradation of the display.

The second input 332 to the switch may be interconnected directly with the third branch 24. This branch 24 is also connected to the frequency demodulator 15 so as to receive the video signal. It has been found desirable to provide a suitable buffing or isolating means such as an emitter follower 338. This will be effective to prevent inter-reactions between the demodulator 15 and the diode switch 276. It will thus be seen that the original video signal including all of the portions having objectionable drop-outs therein will be continuously applied to the second input 332. This signal will be virtually undelayed. However, as will become apparent, it may be desirable to provide a delay line 352 to insure a small delay.

The output from the line 346 may be interconnected with the first input 324 of the switch 276 by means of a suitable isolating or buffing device such as an emitter follower 348. It will thus be seen that the input 324 will have a video signal continuously applied thereto that is substantially identical in all respects to the video signal which is applied to the input 332. However, this signal will be delayed by approximately 63.5 microseconds or the interval between successive scans. Thus, at any given instant the signal on the second input will correspond to a point that is located immediately above the point represented by the signal being applied to the first input.

It may thus be seen that a continuous video signal will be supplied at the output of the diode switching network 276. This signal will normally comprise the non-delayed video signal. However, during intervals when the diode switching network is switched, the delayed video signal will be present at the output.

The output of the switch 276 may be operatively interconnected with the input to a post amplifier 350 that is effective to increase the amplitude of the continuous video signal. The gain of this amplifier 350 is preferably substantially identical to the losses which occur within the various portions of the system 10, and particularly the losses which occur in the emitter follower 338 and switching networks 276 of branches 22 and 24. Thus, the output signal from the post amplifier 350 will be substantially identical in all respects including the amplitude to the original signal derived from the demodulator 15. This will permit inserting the present drop-out compensator 10 into a circuit or removing it from an already existing circuit with little or no changes in the signals.

In order to employ the present drop-out system in a system for reproducing video signals, the input 12 is interconnected with a source of the frequency modulated signals such as the head switcher 9 and the input 13 is interconnected with a source of the video signal such as a demodulator 15. The frequency modulated signal 14 will then be applied to branch 20 and the video signal will then be applied to the branches 22 and 24. In the event that there are no drop-outs in the radio frequency signal, the amplitude of the signal 14 will be substantially constant and free from any notches 16. The radio frequency signal travelling through the branch 20 will have an amplitude 110 and the tunnel diode 96 will appear as a high resistance. As a result, the signal may continue on through the branch 20 and maintain the first bridge circuit 310 biased to a non-conductive state and the second bridge 312 biased conductive. The video signal will then flow from the modulator 15 through the third branch 24, the emitter follower 338 and the bridge 312 of the switch 276 to the output amplifier 350. Thus, this component may be fed on to other suitable utilization means.

In the event that a drop-out occurs, the amplitude envelope of the frequency modulated signal 14 will have a notch 16 therein. This will cause the tunnel diode 96 to become highly conductive and short the component to ground. This will cause a pluse to pass through the amplifier 120 to the ramp generator 164. The potential on the output of the ramp generator 164 will immediately drop substantially coincident with the beginning of the pulse 156. However, when the pulse 156 terminates, it will take a predetermined time for the potential to recover past the level 256. This will cause the Schmitt trigger circuit 222 to switch its state and together with the phase inverter 260 produce a pair of pulses 275 and 277. These two pulses are substantially coincident with the occurrence of the notch 16 but are of increased duration.

These two pulses 275 and 277 will then be applied to the diode switching network 276 so as to bias the first bridge 310 conductive and to bias the second bridge 312 non-conductive. This will then block the non-delayed video signal in branch 24 passing to the output amplifier 350. However, it will permit the component in branch 22 to pass through the bridge 310 to the amplifier 350. This component is a signal from the preceding scan line. It is delayed by the delay line 346 for an interval equal to the period between scans. Thus, the component will very closely resemble the component in the branch 24. As a consequence, a continuous signal will be present at the output amplifier 350 with any portions having drop-out characteristics being replaced by a suitable signal of substantially the same nature. It has been found that normally there will be enough delay of the component in branch 24 to cause the switching action to occur at switch 276 before the notch 16 arrives at the switch. However, under some circumstances, it may be desirable to place a delay line 352 in the branch 24 to insure the switching action occurring before the drop-out reaches the switch.

In the event that the drop-out occurs during a sync portion of the video signal, the foregoing arrangement would cause the sync signal to be replaced with a preceding sync signal. In those systems that are dependent upon the sync signals for each scan line or employ time correction means, this may result in a "pulling" or laterally displaying of the line with a corresponding distortion of the display. Accordingly, in such systems it has been found desirable to disable the present drop-out compensation during the intervals when a sync signal occurs. To accomplish this, a time correction gate 354 is connected to a source of a time correction signal. Each time a sync interval occurs, the gate 354 will clamp the input to the pulse amplifier 204 or the output of the ramp generator 164 to a reference level. This will disable the Schmitt trigger circuit 222 and switch 276 for an interval equal to the sync portion of the video signal. Thus, the signal will not be modified to insert a previous sync signal.

Although only a single embodiment of the present invention has been disclosed and described herein, it will be readily apparent to those skilled in the art that numerous changes and modifications may be made without departing from the spirit of the invention. Accordingly, the foregoing drawings and description thereof are for illustrative purposes only and do not in any way limit the invention which is defined only by the claims which follow.

What is claimed is:

1. A device of the class described for suppressing defects in a video signal having periodically occurring segments that are closely related to the preceding and succeeding segments, said device including:

circuit means for being interconnected with a source of said signals, said circuit means having a first branch effective to provide a first component corresponding to said video signal during one segment and having a second branch effective to provide a second component corresponding to the signal during a substantially identical portion of a succeeding segment, detector means effective to detect defects in said video signal and produce at least one output signal having a first polarity when said video signal is free of defects and has a reverse polarity substantially coincident with the existence of said defects, a first bridge operatively interconnected with one branch of said circuit means for receiving the component in said branch, a second bridge operatively interconnected with the other branch of said circuit means to receive the component in that branch, said bridges being interconnected with each other at a common junction, means interconnecting said detector means with both of said bridges for applying said output signal to said bridges, said output signals when in one polarity being effective to maintain the first of said bridges normally biased in a non-conductive state effective to suppress the component therein and to maintain the other of said bridges conductive to pass the component therein to said junction, said output signals when in the other polarity being effective to maintain the second of said bridges biased non-conductive to suppress the signal therein and to maintain the first of said bridges biased conductive to pass the component therein to said junction, and storage means operatively interconnected with said common junction for maintaining the potential of said junction at a substantially constant reference level that is symmetrically disposed between the potentials of said signals.

2. A device of the class described for suppressing defects in a video signal including a series of periodically occurring segments with each of said segments being closely related to the preceding segments, said device including:

circuit means for being interconnected with a source of said video signals and having a first branch for carrying a first component corresponding to said video signal and a second branch for carrying a second component corresponding to said video signal, means in one of said branches for delaying the components therein by an interval equal to the period of said segments, detector means effective to sense said defects and produce an output signal substantially coincident with said defects, a first diode bridge having a pair of bias corners, an output corner and an input corner, said input corner being interconnected with the first branch of said circuit for receiving said first component, a second diode bridge having a pair of bias corners, an output corner and an input corner, said input corner being interconnected with the second branch of said circuit for receiving said second component, said second output corner being interconnected with said first output corner, means operatively interconnecting said bias corners with said detector means for applying said output signal to said bridges, said output signals being effective to normally maintain said first bridge biased conductive and said second bridge biased non-conductive to thereby permit only said first component to reach said output corner, said output signal being effective during said defect to bias said first bridge to become non-conductive and to bias said second bridge conductive to thereby permit only said second component to reach said output corner, and storage means operatively interconnected with said output corners for accumulating a charge having a slowly varying potential that is an average of the potential applied to the control corners.

3. A device of the class described for suppressing defects in a video signal having periodically occurring segments that are closely related to the preceding and succeeding segments and are separated from each other by a sync interval, said device including:

circuit means for being interconnected with a source of said signals for carrying a first component corresponding to said signal during one of said segments and a second component corresponding to the signal during a substantially identical portion of a succeeding segment, detector means responsive to said video signals for sensing said defects and producing an output signal substantially coincident with said defects, switching means operatively interconnected with said circuit means and having a first conductive state effective to transmit one of said components and to suppress the other of said components and having a second conductive state effective to suppress said one component and to transmit the other of said components, means operatively interconnecting said detector means with said switching means for applying said output signal to said switching means for maintaining said switching means in said second conductive states only during said output signal, and means responsive to said interval between said segments operatively interconnected with said means to maintain said switch means in said first state during said sync interval.

4. A device of the class described for suppressing defects in a video signal having periodically occurring segments that are closely related to the preceding and succeeding segments and are separated from each other by intervals of sync signals, said device including:

circuit means for being interconnected with a source of said signals, said circuit means having a first branch for carrying a first component corresponding to said signal during one of said segments and a second branch for carrying a second component corresponding to the preceding component in said first branch, switching means operatively interconnected with said circuit means and having a first conductive state effective to transmit one of said components and to suppress the other of said components and having a second conductive state effective to suppress said one component and to transmit the other of said components, detector means responsive to said video signal for sensing said defects, said detector means being effective to produce an output signal substantially coincident with said defects, means operatively interconnecting said detector means and said switching means for feeding said output signal to said switching means for maintaining said switching means in said first conductive states only during said output signal, and means operatively interconnected with said source of signals and responsive to said sync interval to provide a blocking signal, said last means being operatively interconnected with said detector means for feeding said blocking signal thereto, said blocking signal being effective to block said detector during said sync interval and maintain said switching means in said second state during said sync interval.

5. In combination, a source of a carrier signal normally having an amplitude that is greater than a predetermined amount and is frequency modulated by a video signal having periodically occurring segments with each of the segments being closely related to the preceding and succeeding segments, a demodulator interconnected with said source for demodulating said carrier signal to obtain said video signal, means connected to the demodulator for delaying the video segment by a particular number of periodically occurring segments, detector means constructed to provide a high impedance for voltage amplitudes above a particular value and to provide a low impedance for voltage amplitudes below the particular value, the detector means being connected to the source and responsive to the amplitude of the carrier wave for passing the carrier wave during the occurrence of the high impedance in the detector means and for bypassing the carrier wave during the occurrence of the low impedance in the detector means, switch means operatively interconnected with said detector means and having first and second conductive states, said detector means being effective to maintain said switch means in the first conductive state whenever the detector means passes the carrier signal and in the second conductive state when the detector means bypasses the carrier signal, said switch means being operatively interconnected with said demodulator and said delay means for simultaneously receiving said video signal and said delayed video signal, said switch means being effective to suppress the delayed video signal and pass the video signal when in the first conductive state and being effective to suppress the video signal and pass the delayed video signal when in the second conductive state.

6. In combination, a source of a carrier signal normally having an amplitude that is greater than a particular value and is frequency modulated by a video signal having periodically occurring segments with each of the segments being closely related to the preceding and succeeding segments, a demodulator interconnected with said source for demodulating said carrier signal to obtain said video signal, means interconnected with the demodulator for delaying the video signal by a particular number of segments, detector means operatively interconnected with said source and instantaneously responsive to the amplitude of said carrier wave to provide a high impedance for amplitude modulations above the particular amplitude and to provide a low impedance for amplitude modulations below the particular amplitude, a switch driver operatively interconnected with said detector means, said detector means being effective to actuate said switch driver to provide a first control signal when the detector means has a high impedance and a second control signal when the detector means has a low impedance, and switch means provided with first and second conductive states and operatively interconnected with said demodulator and said delay means and said detector means for simultaneously receiving said video signal and said delayed video signal to pass the video signal in the first conductive state and to pass the delayed video signal in the second conductive state, said switch means being operatively interconnected with said switch driver and responsive to said first and second control signals for switching to the first conductive state upon the introduction of said first control signal and the second conductive state upon the introduction of the second control signal.

7. In combination, a source of a carrier signal having an amplitude that is normally greater than a particular value and is frequency modulated by a video signal having periodically occurring segments with each of the segments being closely related in information characteristics to the preceding and succeeding segments, detector means operatively interconnected with said source and instantaneously responsive to the amplitude of said carrier signal to provide a high impedance for amplitudes above the particular value and to provide a low impedance for amplitudes below the particular value, switch means provided with first and second conductive states and operatively interconnected with said detector means to become biased into the first conductive state upon the occurrence of the high impedance in the detector means and to become biased into the second conductive state upon the occurrence of the low impendance in the detector means, demodulator means operatively interconnected with said source for demodulating said carrier signal to obtain said video signals, delay line means operatively connected with said demodulator means for delaying said video signal by an interval substantially equal to the duration of a particular number of said segments, and said switch means being operatively interconnected with said demodulator means and said delay line means for receiving the video signal and the delayed video signal, said switch means being responsive to said detector means to suppress the delayed video signal and to pass the video signal when in the first conductive state and to suppress the video signal and to pass the delayed video signal when in the second conductive state.

8. The combination set forth in claim 7, including, means responsive to a change in the operation by the detector means from the low impedance to the high impedance for providing a particular delay, and means responsive to the particular delay provided by the last mentioned means for obtaining an operation of the switch means in the first conductive state only after the particular delay.

9. In combination for suppressing defects in a frequency modulated signal normally having an amplitude that is greater than a particular value and representing video information and modulated with periodically occurring signals with each of the signals being closely related to the preceding and succeeding signals, said device including:

circuit means having an input for receiving said periodic signals, a first branch in said circuit means for passing periodic signals, a second branch in said circuit means for passing said periodic signals, time delay means in said second branch, said time delay means providing a delay substantially equal to an integral multiple of the period between said periodic signals, switch means having first and second conductive states and operatively interconnected with both of said branches and effective when in the first conductive state to pass the periodic signals from the first branch and to suppress the delayed periodic signals from the second branch and effective when in the second conductive state to suppress said periodic signals from the first branch and to transmit said delayed periodic signals from said second branch, detector means instaneously responsive to the amplitude of said frequency modulated signal, said detector means being operative to pass the frequency modulated signal upon the occurrence of amplitudes above a particular value in the frequency modulated signal and to bypass the frequency modulated signal upon the occurrence of amplitudes below the particular value in the frequency modulated signal, and means operatively interconnecting said detector means with said switch means for obtaining an operation of the switch means in the first conductive state during the passage of the frequency modulated signal through the detector means and for obtaining an operation of the switch means in the second conductive state upon the bypassing of the frequency modulated signal by the detector means.

10. The combination set forth in claim 9 wherein means are responsive to a change in the amplitude of the frequency modulated signal from a value below the particular value to a value above the particular value for providing a particular delay and wherein the means operatively interconnecting the detector means and the switch means are responsive to such particular delay for providing for a change in operation of the switch means from the second conductive state to the first conductive state only after such particular delay.

11. In combination for suppressing defects in a video signal having a series of successive segments wherein each segment is related to the preceding and succeeding segment, a source of a carrier signal modulated with the video signal, a demodulator connected to said source to demodulate said carrier signal to provide said video signal, circuit means interconnected with said demodulator to provide a first video component corresponding to said video signal during one segment and a second video component corresponding to the video signal during a substantially identical portion of a succeeding segment, detector means operatively interconnected with said source and instantaneously responsive to the first video component for sensing said defects in said component to normally provide a high impedance and to provide a low impedance upon the occurrence of the defects in the first video component, amplifier means operatively connected to the detector means for producing a pair of output pulses of opposite polarities upon the production of the low impedance in the detector means, switching means having a first section operatively interconnected with said circuit means for receiving the first component and a second section operatively interconnected with said circuit means to receive the second component, said sections being operatively interconnected with each other at a common junction, said switching means being constructed to provide a conductivity of the first section and a non-conductivity of the second section at first particular times and a conductivity of the second section and a non-conductivity of the first section at other times, means operatively interconnected with the switching means for selectively passing the components introduced to the conductive section, and means interconnecting said amplifier means with said sections for applying said output pulses to said sections, said sections being normally operative with the first section conductive and the second section non-conductive and being responsive to said output pulses to make the second section conductive and the first section non-conductive during the occurrence of the pair of output pulses.

12. The combination set forth in claim 11 wherein the amplifier means are operatively connected to the detector means to extend the duration of the pair of output pulses for a particular time beyond the duration of the defects in the video signal.

13. In combination for suppressing defects in a video signal having periodically occurring segments representing visual information with the visual information in each section closely related to the information in the preceding and succeeding segments, circuit means for receiving said video signal, said circuit means having a first branch constructed to provide a first component corresponding to said video signal and having a second brand constructed to provide a second component corresponding to the video signal delayed by a particular number of segments, detector means constructed to sense defects in said video signal, said detector means being constructed and arranged to produce a pair of output pulses of opposite polarities substantially coincident with the occurrence of said defects, switching means having a first section operatively interconnected with the first branch of said circuit means for receiving the first component and a second section operatively interconnected with the second branch of said circuit means to receive the second component, said sections of said switch means being interconnected with each other at a common output junction, each of said sections of said switch means having a conductive and a non-conductive state, means interconnecting said detector means with both of said sections of said switch means to normally maintain the first section of said switch means in the conductive state and the second section of said switch means in the non-conductive state and to produce the conductive state in the second section and the non-conductive state in the first section during the production of the output pulses of opposite polarities, and storage means operatively interconnected with said switching means and responsive to the conductivity of the first and second sections of the switching means for maintaining said common junction at a reference level that is symmetrically disposed between said output pulses.

14. The combination set forth in claim 13 wherein means are connected to the detector means to sense the end of said defects in said video signals and to extend the duration of the output pulses for a particular period of time after the end of such defects and wherein means are connected to the switch means to pass the particular one of the first and second components introduced at each instant to the conductive one of the first and second sections of the switch means.

15. In combination for suppressing defects in a video signal having periodically occurring segments representing visual information with the visual information in each section closely related to the visual information in the preceding and succeeding segments, circuit means for receiving said video signals, said circuit means having a first branch constructed to provide a first component corresponding to said video signal and having a second branch constructed to provide a second component corresponding to the video signal delayed by a particular number of segments, detector means constructed to detect defects in said video signal and produce first and second output signals respectively having first and second polarities when said video signal is free of defects and having the second and first polarities during the existence of said defects, a first bridge operatively interconnected with the first branch of said circuit means for receiving the component in said branch, a second bridge operatively interconnected with the second branch of said circuit means to receive the component in that branch, said bridges being interconnected with each other at a common junction, means interconnecting said detector means with said bridges for respectively applying said first and second output signals to said first and second bridges to maintain the first bridge in the conductive state and the second bridge in the non-conductive state during the production of the first polarity in the first output signal and the production of the second polarity in the second output signal and to maintain the second bridge in the conductive state and the first bridge in the non-conductive state during the production of the second polarity in the first output signal and the production of the first polarity in the second output signal, and means connected to the first and second bridges to receive at each instant the component introduced to the conductive one of the first and second bridges.

16. The combination set forth in claim 15 wherein means are connected to the detector means to increase the duration of the output pulses from the detector means for a particular period of time beyond the end of the defects in the video signal.

17. The combination set forth in claim 15 wherein the video signal includes at least one sync pulse at a particular time in each segment and wherein means are included for suppressing the sync pulse during the period of conductivity of the second bridge.

18. In combination for suppressing defects in a video signal including a series of periodically occurring segments representing video information with the visual information in each of said segments being closely related to the visual information in the preceding segments, circuit means for receiving said video signal and having a first branch for carryng a first component corresponding to said video signal and a second branch for carrying a second component corresponding to said video signal delayed by an integral number of segments, means in one of said branches for delaying the video signal by the integral number of said segments, detector means instantaneously responsive to the video signal for passing the video signal for amplitudes above a particular value and for blocking the passage of the video signal for amplitudes below the particular value, amplifier means connected to the detector means for providing first and second pulses respectively having first and second output polarities during the period in which the video signal is being blocked by the detector means, a first bridge having a pair of bias corners, an output corner and an input corner, said input corner being interconnected with the first branch of said circuit means for receiving said first component, a second bridge having a pair of bias corners, an output corner and an input corner, said input corner being interconnected with the second branch of said circuit means for receiving said second component, and means operatively interconnecting said bias corners of said first and second bridges with said amplifier means for respectively applying said first and second output signals to said bias corners of said first and second bridges to normally maintain said first bridge biased conductive and said second bridge biased non-conductive and to make said first bridge non-conductive and said second bridge conductive during the production of the first and second pulses by the amplifier means.

19. The combination set forth in claim 18 wherein ramp generator means are connected to the amplifier means to extend the duration of the first and second pulses for a particular period of time beyond the end of the defects in the video signal and wherein the video signal is provided with a sync signal at a particular time in each segment and wherein means are provided for inhibiting the introduction of the sync signal in the second component to the second bridge.

20. In combination for suppressing defects in a frequency modulated video signal having periodically occurring segments with the video information in each segment being closely related to the video information in the preceding segment, circuit means for receiving said video signal, said circuit means including a first branch for passing said video signal and including a second branch for delaying said video signal by an integral number of segments, detector means responsive to the amplitude of said video signal to detect defects in said video signal and provide an output pulse during the occurrence of amplitudes less than a particular value in the input signal, pulse means having a normal state and a second state and operatively interconnected with said detector means and responsive to said output pulse to change from its normal state to its second state substantially coincident with the commencement of said output pulse and to return to its normal state a particular interval after the termination of said output pulse, switching means operatively interconnected with said first and second branches of said circuit means, and means operatively interconnecting said pulse means and said switching means to obtain a passage by said switching means of said first component and a suppression by said switching means of said second component in the normal state of said pulse means and to obtain a suppression by said switching means of said first component and a passage by said switching means of said second component in the second state of said pulse means.

21. The combination set forth in claim 20 wherein the detector means includes an element providing a high impedance upon the introduction of voltages above the particular amplitude and providing a low impedance upon the introduction of voltages below the particular amplitude and wherein the element is connected in the detector means to provide a pulse during the production of the low impedance by the element and wherein the switching means includes a pair of bridges respectively connected to the first and second branches of the circuit means and to the pulse means to provide normally for the passage of the first component by the first bridge and for the passage of the second component by the second bridge during the operation of the pulse means in the second state.

22. The combination set forth in claim 20 wherein the video signal includes a sync signal at a particular time in each segment and where means are provided for inhibiting the passage of the sync signal through the switching means during the operation of the pulse means in the second state.

References Cited

UNITED STATES PATENTS

| | | | |
|---|---|---|---|
| 2,353,631 | 7/1944 | Bliss | 178—6.6 |
| 2,913,675 | 11/1959 | Curtis | 307—88.5 |
| 2,996,576 | 8/1961 | Dolby | 178—6.6 |

DAVID G. REDINBAUGH, *Primary Examiner.*

H. W. BRITTON, *Assistant Examiner.*